United States Patent Office 2,802,892
Patented Aug. 13, 1957

2,802,892

PROTECTION OF RUBBER FROM OZONE BY MEANS OF BIS(2-ALKYL-4-ISOPROPYLPHENOL) MONOSULFIDES

Harry E. Albert, Akron, Ohio, assignor to The Firestone Tire & Rubber Company, Akron, Ohio, a corporation of Ohio No Drawing. Application December 24, 1953, Serial No. 400,348

8 Claims. (Cl. 260—810)

This invention relates to antiozone agents which inhibit or prevent the deterioration of natural rubber. These agents are bis(2-alkyl-4-isopropylphenol) monosulfides in which the 2-alkyl group may be replaced by cycloalkyl or aralkyl. The 2-substituent contains up to nine carbon atoms. Compounds containing at least three carbon atoms in the 2-substituent are preferred because they are non-discoloring.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only (C. H. Leigh-Dugmore, Rubber Age and Synthetics, November and December, 1952), and forms cracks perpendicular to the direction of stretch, and such cracking can occur in the absence of light.

As a matter of fact, practically all commercial rubber antioxidants are without effect in inhibiting deterioration caused by ozone. The bis(2-alkyl-4-isopropylphenol) monosulfides of this invention do not absorb or act directly on the ozone, but have some unknown action in preventing the cracking which is associated with ozone exposure in stretched natural rubber.

Natural rubber is used in the manufacture of the white sidewalls of tires. The cracking of such sidewalls has long been a problem. It is often very extensive, and because of the color of the sidewall, it is very noticeable. It is a primary object of this invention to provide antiozone agents which prevent such cracking without discoloring the sidewall. However, the antiozone agents of this invention are not limited to that use but can be employed in black sidewalls, treads, thread and other latex products, and other rubber products.

Tires are stressed when inflated. While a tire is at rest it is stretched statically, and on a moving vehicle it is stretched dynamically. Some of the antiozone agents are more effective in static tests and others are more effective in dynamic tests. Antiozone agents effective under both conditions will be desired for tires, but for other rubber products an antiozone agent which does not meet both tests may be used.

The bis(2-alkyl-4-isopropylphenol) monosulfides of this invention are illustrated by the following compounds:

Bis(2,4-diisopropylphenol) monosulfide
Bis(2-t-butyl-4-isopropylphenol) monosulfide
Bis(2-sec.-butyl-4-isopropylphenol) monosulfide
Bis(2-cyclohexyl-4-isopropylphenol) monosulfide
Bis(2-nonyl-4-isopropylphenol) monosulfide
Bis(2-benzyl-4-isopropylphenol) monosulfide
Bis(2-α-methylbenzyl-4-isopropylphenol) monosulfide
Bis(2-t-amyl-4-isopropylphenol) monosulfide
Bis(2-t-hexyl-4-isopropylphenol) monosulfide
Bis(2-tt-octyl-4-isopropylphenol) monosulfide
Bis(2-t-heptyl-4-isopropylphenol) monosulfide The inhibiting effect of the antiozone agents in rubber was determined by treatment of unaged, cured stocks with air of controlled low ozone content is specially designed equipment and also by outdoor exposure to natural weathering. The tests were conducted with one-half inch dumbbell samples of approximately 100 gauge thickness. The special apparatus used for this testing is described in the articles by Ford and Cooper, appearing in India Rubber World for September and October, 1951, entitled "A study of the factors affecting the weathering of rubber-like materials." The following reports of such tests give the ozone concentration maintained during each test in parts per 100,000,000 parts of air, the duration of the test, and the temperature used. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. No special lights were used in either test. On completion of each test the size of the cracks in each sample was compared visually with the size of the cracks in a blank which contained no antiozone agent and which was cured and tested at the same time as the test sample. The size was determined according to an arbitrary scale of measuring, using the numerals 0, 1, 2, 3, 4 and 5 to represent no visual cracking and cracks which were very fine, fine, medium, coarse and very coarse, respectively.

The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

The antiozone agents were tested in white stock such as might be used in white sidewalls for tires, and also in stock such as that which might be used in tire treads. The blanks of the white stock were compounded according to the following formula:

| | Parts by weight |
|---|---|
| Natural rubber | 100 |
| White pigment and filler | 90.2 |
| Stearic acid | 1.2 |
| Sulfur | 3.0 |
| Accelerator | 0.9 |

All blanks and test samples of white stock were cured 60 minutes at 280° F.

The blanks used for testing the effect of the antiozone agents in tread stock were compounded according to the following formula:

| | Parts by weight |
|---|---|
| Natural rubber | 100 |
| Sulfur | 2.2 |
| Carbon black | 45 |
| Pine tar | 2.0 |
| Stearic acid | 2.0 |
| Accelerator | 1.0 |
| Zinc oxide | 3.0 |

All blanks and test samples of tread stock were cured 45 minutes at 280° F.

In all of the test samples, both those tested in the special apparatus and those subjected to natural outdoor weathering, 2.0 parts by weight of the antiozone agent was added to the blank formula for each 100 parts by weight of the rubber present. Any substantial small amount can be employed, and this can vary, for example, from 0.2 part by weight to 10 parts by weight, depending upon the use to be made of the rubber composition.

The following examples illustrate the invention. Table 1 refers to tests made in white stock, and Tables 2, 3 and 4 refer to tests in tread stock, the parts listed at the top of each table being by weight. Each table gives tensile properties of the stocks before and after aging, as well as the results of antiozone tests in the special apparatus.

Table 1.—White stock

| | | | |
|---|---|---|---|
| Blank | 195.3 | 195.3 | 195.3 |
| Bis(2,4-diisopropylphenol) monosulfide | | 2 | |
| Bis(2-tt-octyl-4-isopropylphenol) monosulfide | | | 2 |
| Normal Tensile Properties: | | | |
| 400% Modulus | 775 | 700 | 675 |
| Tensile Strength | 3,085 | 3,215 | 3,150 |
| Elongation at Break | 615 | 635 | 640 |
| Aged 2 Days in Oven at 212° F.: | | | |
| 400% Modulus | 600 | 875 | 775 |
| Tensile Strength | 1,325 | 1,900 | 2,050 |
| Elongation at Break | 500 | 535 | 570 |
| Ozone Effects (7 hours at 60 p. p. h. m. and 95° F.): | | | |
| Static | 4− | 1 | 1 |
| Dynamic | 4 | 1− | 1 |

Table 2.—Tread stock

| | | |
|---|---|---|
| Blank | 155.2 | 155.2 |
| Bis(2-tt-octyl-4-isopropylphenol) monosulfide | | 2 |
| Normal Tensile Properties: | | |
| 400% Modulus | 2,650 | 2,525 |
| Tensile Strength | 4,300 | 3,935 |
| Elongation at Break | 550 | 525 |
| Aged 2 Days in Oven at 212° F.: | | |
| 300% Modulus | 1,675 | 1,775 |
| Tensile Strength | 1,900 | 2,210 |
| Elongation at Break | 325 | 345 |
| Ozone Effects (7 hours at 25 p. p. h. m. and room temperature): | | |
| Static | 3+ | 0+ |
| Dynamic | 2 | 0+ |
| Ozone Effects (14 hours at 25 p. p. h. m. and room temperature): | | |
| Static | 3+ | 0+ |
| Dynamic | 3+ | 0+ |

Table 3.—Tread stock

| | | |
|---|---|---|
| Blank | 155.2 | 155.2 |
| Bis(2-t-butyl-4-isopropylphenol) monosulfide | | 2 |
| Normal Tensile Properties: | | |
| 400% Modulus | 2,675 | 2,600 |
| Tensile Strength | 4,200 | 4,325 |
| Elongation at Break | 525 | 545 |
| Aged 2 Days in Oven at 212° F.: | | |
| 300% Modulus | 1,650 | 1,550 |
| Tensile Strength | 1,925 | 1,975 |
| Elongation at Break | 335 | 355 |
| Ozone Effects (7 hours at 25 p. p. h. m. and room temperature): | | |
| Static | 3 | 0+ |
| Dynamic | 2 | 0 |
| Ozone Effects (14 hours at 25 p. p. h. m. and room temperature): | | |
| Static | 2 | 1 |
| Dynamic | 2 | 0+ |

Table 4.—Tread stock

| | | |
|---|---|---|
| Blank | 155.2 | 155.2 |
| Bis(2,4-diisopropylphenol) monosulfide | | 2 |
| Norman Tensile Properties: | | |
| 400% Modulus | 2,600 | 2,375 |
| Tensile Strength | 3,700 | 4,100 |
| Elongation at Break | 525 | 545 |
| Aged 2 Days in Oven at 212° F.: | | |
| 400% Modulus | | |
| Tensile Strength | 2,075 | 2,050 |
| Elongation at Break | 345 | 345 |
| Ozone Effects (14 hours at 25 p. p. h. m. and room temperature): | | |
| Static | 2 | 1− |
| Dynamic | 3− | 0+ |

The cracks developed in the test samples recorded above, all were smaller than the cracks developed in the blanks.

Table 5 shows that white test samples exposed to the elements developed smaller cracks than the blank, which contained no antiozone agents. In the headings, F, B and E stand for the front, back and edge of the samples, respectively. The crack size is reported in each instance.

Table 5.—Evaluation of white stocks after outdoor exposure

| | After 30 Days | | |
|---|---|---|---|
| | F | B | E |
| Blank | 5− | 2 | 4 |
| Bis(2,4-diisopropylphenol) monosulfide | 3 | 1+ | 2+ |

Table 6 records weathering tests for different lengths of time on the black tread stocks reported above. The antiozone agents were tested in separate groups and each group and each group included a different blank. Therefore, in evaluating the results, each sample is to be compared with the blank next above it. The results are spaced to facilitate such comparison. The samples were evaluated as in Table 5.

Table 6.—Evaluation of tread stocks after weathering

| | After 30 Days | | After 90 Days | | |
|---|---|---|---|---|---|
| | F | B | F | B | E |
| Blank | 2+ | 2− | 2+ | 2 | 3+ |
| Bis(2-tt-octyl-4-isopropylphenol) monosulfide | 1−2 | 1−1+ | 1−2 | 1−1 | 1 2 |
| Blank | | | | | |
| Bis(2-t-butyl-4-isopropylphenol) monosulfide | 1−2 | 1−2− | 1−2+ | 1−1+ | 1−2+ |
| Blank | | | | | |
| Bis(2,4-diisopropylphenol) monosulfide | 1 | 1 | 1 | 1 | 1 |

The recorded results are illustrative. The antiozone agents may be used in rubber compositions compounded for use in tires and for latex compositions compounded for use in rubber thread and in other rubber stocks.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylenedithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What I claim is:

1. A sulfur-vulcanized natural rubber composition which contains a small amount of a bis(2-alkyl-4-isopropylphenol) monosulfide in which the 2-alkyl group contains three to nine carbon atoms per molecule of the monosulfide.

2. A sulfur-vulcanized natural rubber composition which contains a small amount of bis(2-t-butyl-4-isopropylphenol) monosulfide.

3. A sulfur-vulcanized natural rubber composition which contains a small amount of bis(2,4-diisopropylphenol) monosulfide.

4. A sulfur-vulcanized natural rubber composition which contains a small amount of bis(2-tt-octyl-4-isopropylphenol) monosulfide.

5. The process of sulfur-vulcanizing a natural rubber composition which comprises vulcanizing such composition in the presence of a small amount of a bis(2-alkyl-4-isopropylphenol) monosulfide, in which the 2-alkyl group contains three to nine carbon atoms per molecule of the monosulfide.

6. The process of sulfur-vulcanizing a natural rubber composition which comprises vulcanizing such composition in the presence of a small amount of bis(2-t-butyl-4-isopropylphenol) monosulfide.

7. The process of sulfur-vulcanizing a natural rubber composition which comprises vulcanizing such composition in the presence of a small amount of bis(2,4-diisopropylphenol) monosulfide.

8. The process of sulfur-vulcanizing a natural rubber composition which comprises vulcanizing such composition in the presence of a small amount of bis(2-tt-octyl-4-isopropylphenol) monosulfide.

References Cited in the file of this patent
UNITED STATES PATENTS

| | | |
|---|---|---|
| 2,364,338 | Beaver | Dec. 5, 1944 |
| 2,700,691 | Mayes | Jan. 25, 1955 |

U. S. DEPARTMENT OF COMMERCE
PATENT OFFICE

CERTIFICATE OF CORRECTION

Patent No. 2,802,892                                                   August 13, 1957

Harry E. Albert

It is hereby certified that error appears in the printed specification of the above numbered patent requiring correction and that the said Letters Patent should read as corrected below.

Column 2, line 8, for "content is" read -- content in --; column 3, line 62, Table 4, first column thereof, for "Norman" read -- Normal --; column 4, line 18, strike out "and each group".

Signed and sealed this 25th day of February 1958.

(SEAL)
Attest:

KARL H. AXLINE
Attesting Officer

ROBERT C. WATSON
Commissioner of Patents